(12) United States Patent
Jørgensen et al.

(10) Patent No.: US 10,092,013 B1
(45) Date of Patent: Oct. 9, 2018

(54) METHOD FOR PROCESSING OF HIGH MEAT CONTENT FOOD OR FEED PRODUCTS

(71) Applicant: Wenger Manufacturing Inc., Sabetha, KS (US)

(72) Inventors: Thomas Jørgensen, Kolding (DK); LaVon Wenger, Sabetha, KS (US)

(73) Assignee: Wenger Manufacturing, Inc., Sabetha, KS (US)

( * ) Notice: Subject to any disclaimer, the term of this patent is extended or adjusted under 35 U.S.C. 154(b) by 0 days.

(21) Appl. No.: 15/995,836

(22) Filed: Jun. 1, 2018

Related U.S. Application Data

(62) Division of application No. 14/801,946, filed on Jul. 17, 2015.

(51) Int. Cl.
| | | |
|---|---|---|
| *A22C 17/00* | (2006.01) | |
| *A23P 20/20* | (2016.01) | |
| *A23P 30/20* | (2016.01) | |
| *A23L 13/60* | (2016.01) | |
| *A23K 40/25* | (2016.01) | |
| *A23K 10/20* | (2016.01) | |

(52) U.S. Cl.
CPC .......... *A22C 17/0006* (2013.01); *A23K 10/20* (2016.05); *A23K 40/25* (2016.05); *A23L 13/60* (2016.08); *A23P 30/20* (2016.08)

(58) Field of Classification Search
CPC ............................ A22C 17/0006; A23P 30/20
USPC ................... 366/156.1, 156.2; 426/513, 516
See application file for complete search history.

(56) References Cited

U.S. PATENT DOCUMENTS

| | | | |
|---|---|---|---|
| 1,938,880 | A | 12/1933 | White |
| 1,949,374 | A | 2/1934 | Johnson |
| 2,021,899 | A | 11/1935 | Schneider |
| 2,494,891 | A | 1/1950 | Marshall |

(Continued)

FOREIGN PATENT DOCUMENTS

| | | |
|---|---|---|
| EP | 0400700 A1 | 12/1990 |
| EP | 0797922 A2 | 10/1997 |

(Continued)

OTHER PUBLICATIONS

Fang, et al. "Extrusion Systems: Components." Biological Systems Engineering: Papers and Publication. Paper 310.2010. Available online at http://digitalcommons.unl.edu/cgi/viewcontent.cgi?article=1312&context=biosysengfacpub (Accessed Jun. 30, 2015).

(Continued)

*Primary Examiner* — David L Sorkin
(74) *Attorney, Agent, or Firm* — Hovey Williams LLP

(57) ABSTRACT

Food or feed processing systems (10, 96) include an extruder (14) and a downstream processor (16, 16*a*), and are operable to process high meat food or feed formulations. The processors (16, 16*a*) include an elongated processor barrel (38) presenting an inner surface (44) with a central body or tube (60) within the barrel (38) and presenting an outer surface (62). The surfaces (38, 62) thereby define an elongated annular processing region (70). The barrel (38) and tube (60) are steam heated by means of apparatus (52, 66). A rotatable processing element (72) is also located within the region (70). The element (72) has a plurality of helical vanes (88, 104), which scrape the surfaces (44, 62) to prevent buildup of material on these surfaces.

16 Claims, 4 Drawing Sheets

(56) References Cited

U.S. PATENT DOCUMENTS

| | | |
|---|---|---|
| 3,078,514 A | 2/1963 | Gray |
| 3,255,815 A | 6/1966 | Smith |
| 3,694,227 A | 9/1972 | Vezzani |
| 3,883,672 A | 5/1975 | Bone et al. |
| 4,001,452 A * | 1/1977 | Williams ............ A23N 17/005 426/454 |
| 4,126,177 A | 11/1978 | Smith et al. |
| 4,139,648 A | 2/1979 | Small et al. |
| 4,245,552 A | 1/1981 | Small et al. |
| 4,272,466 A | 6/1981 | Harris |
| 4,279,295 A | 7/1981 | Duckworth |
| 4,842,883 A | 6/1989 | Amstad |
| 4,900,158 A | 2/1990 | Ugolini |
| 4,958,933 A | 9/1990 | Zakich |
| 5,074,125 A | 12/1991 | Schifferly |
| 5,165,469 A | 11/1992 | Smith |
| 5,228,775 A | 7/1993 | Horn et al. |
| 5,622,744 A | 4/1997 | Matson et al. |
| 5,964,278 A | 10/1999 | Langoy et al. |
| 6,536,939 B1 | 3/2003 | Blue |
| 7,097,345 B2 | 8/2006 | Ueda et al. |
| 7,588,789 B1 | 2/2009 | Kearns et al. |
| 7,811,617 B1 | 10/2010 | Wenger et al. |
| 7,922,384 B2 | 4/2011 | Voorthuysen et al. |
| 8,177,414 B1 | 5/2012 | Wenger |
| 8,628,815 B2 | 1/2014 | Torney et al. |
| 2009/0068336 A1 | 3/2009 | Torney et al. |
| 2009/0208612 A1 | 8/2009 | Reiser et al. |
| 2011/0001257 A1 | 1/2011 | Kenneally et al. |
| 2014/0037812 A1 | 2/2014 | Oxboll et al. |

FOREIGN PATENT DOCUMENTS

| | | |
|---|---|---|
| EP | 2733453 A1 | 5/2014 |
| GB | 1174906 A | 12/1969 |
| RU | 2409993 C2 | 1/2011 |
| WO | 9306742 | 4/1993 |
| WO | 2010132060 A1 | 11/2010 |
| WO | 2012139725 A1 | 10/2012 |

OTHER PUBLICATIONS

"Extrusion Cooking and Related Technique.," Extrusion-Cooking Techniques: Applications, Theory and Sustainability. Ed. Moscicki et al. Weinheim: WILEY-VCH Verlag GmbH & Co. KGaA, 2011. 1-24. Available online at http://www.wiley-vch.de/books/sample/3527328882_c01.pdf (Accessed Jun. 30, 2015).

DK Application No. PA 201570476 Danish Search Report and Search Opinion, dated Feb. 23, 2016.

International Search Report and Written Opinion dated Sep. 26, 2016 in PCT Application No. PCT/US16/41949.

International Search Report and Written Opinion dated Aug. 7, 2016 in PCT Application No. PCT/DK2016/050245.

EP Search Report dated Jul. 19, 2018 in EP Application No. 16828244.0 (PCT/US2016041949).

\* cited by examiner

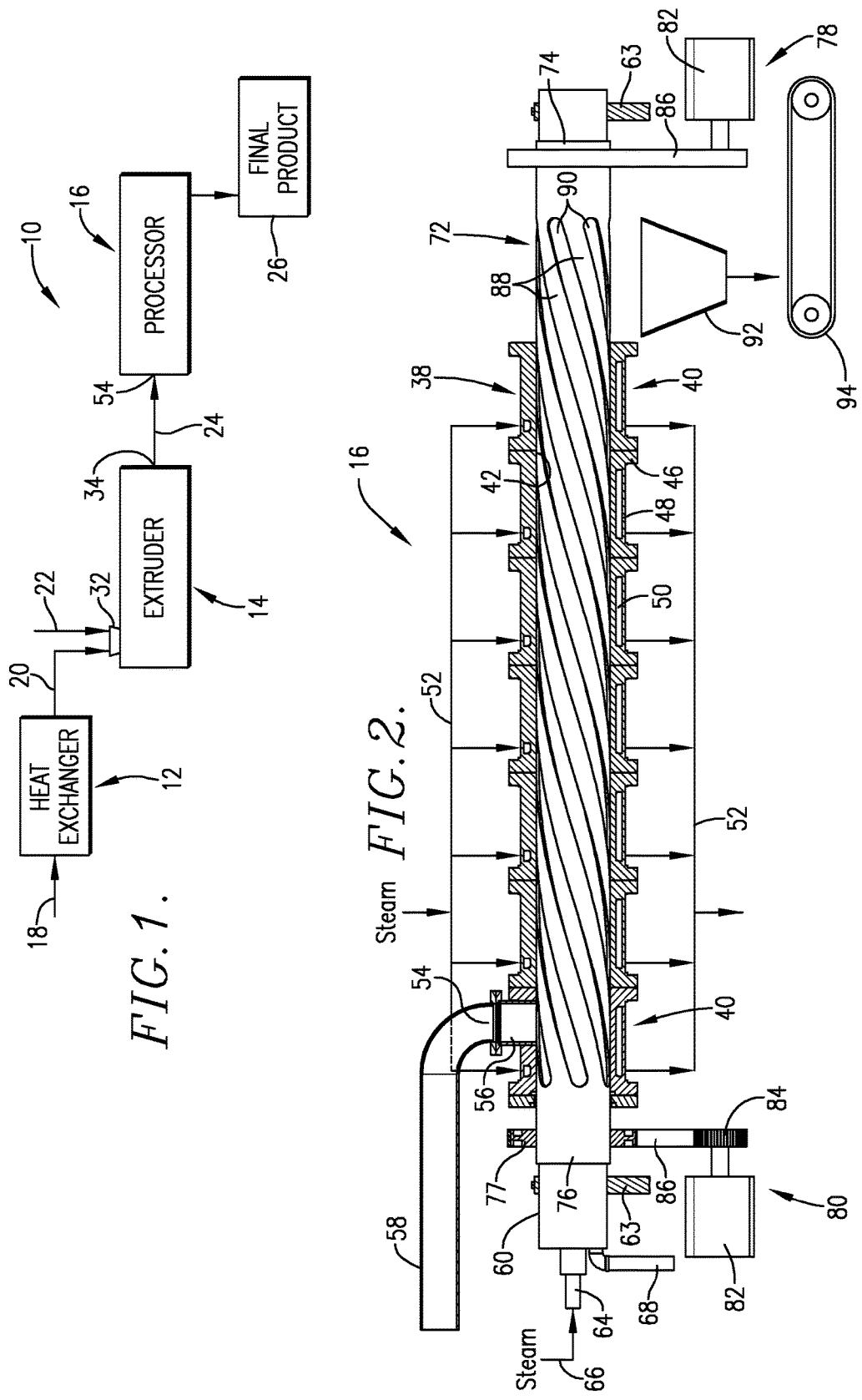

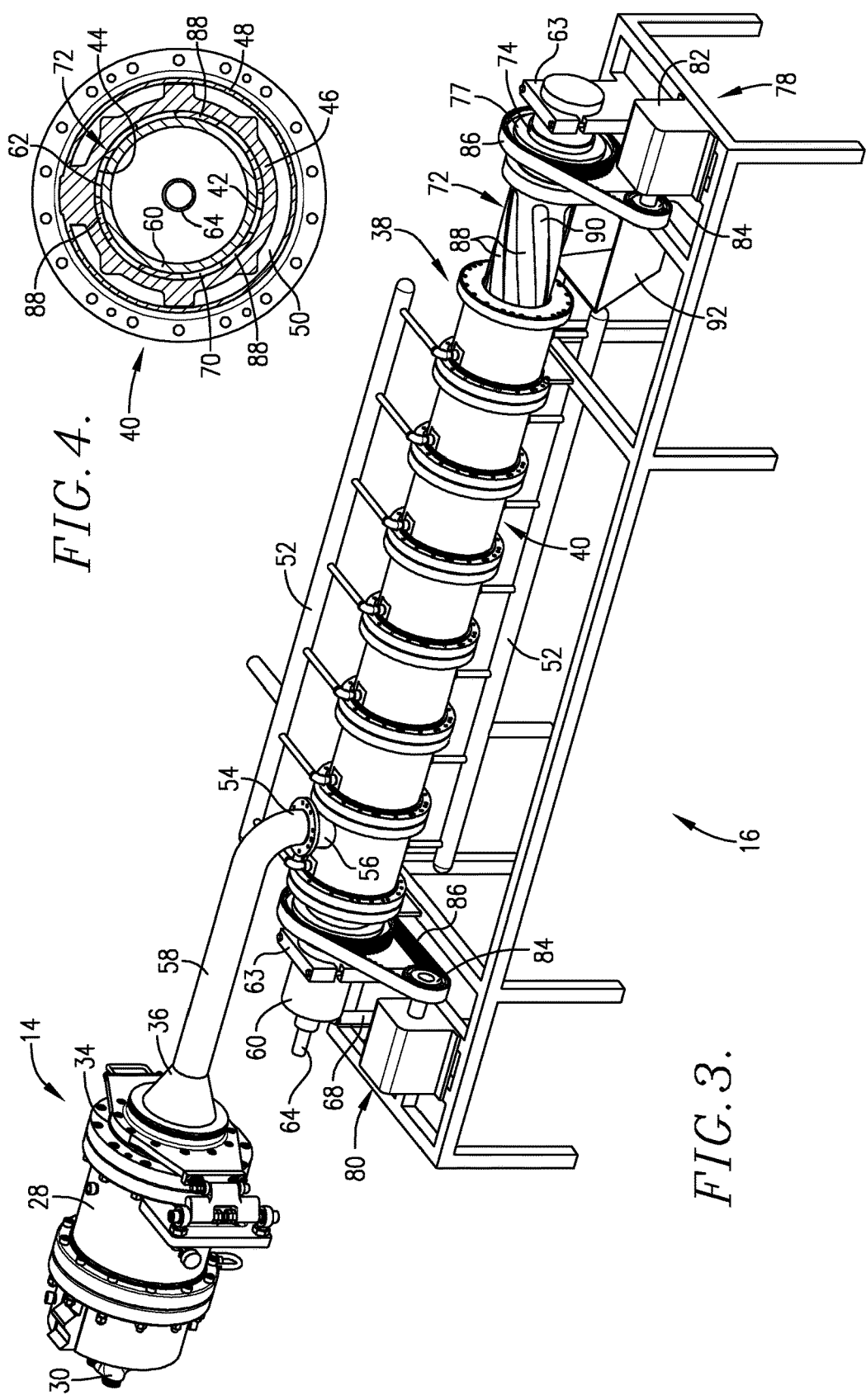

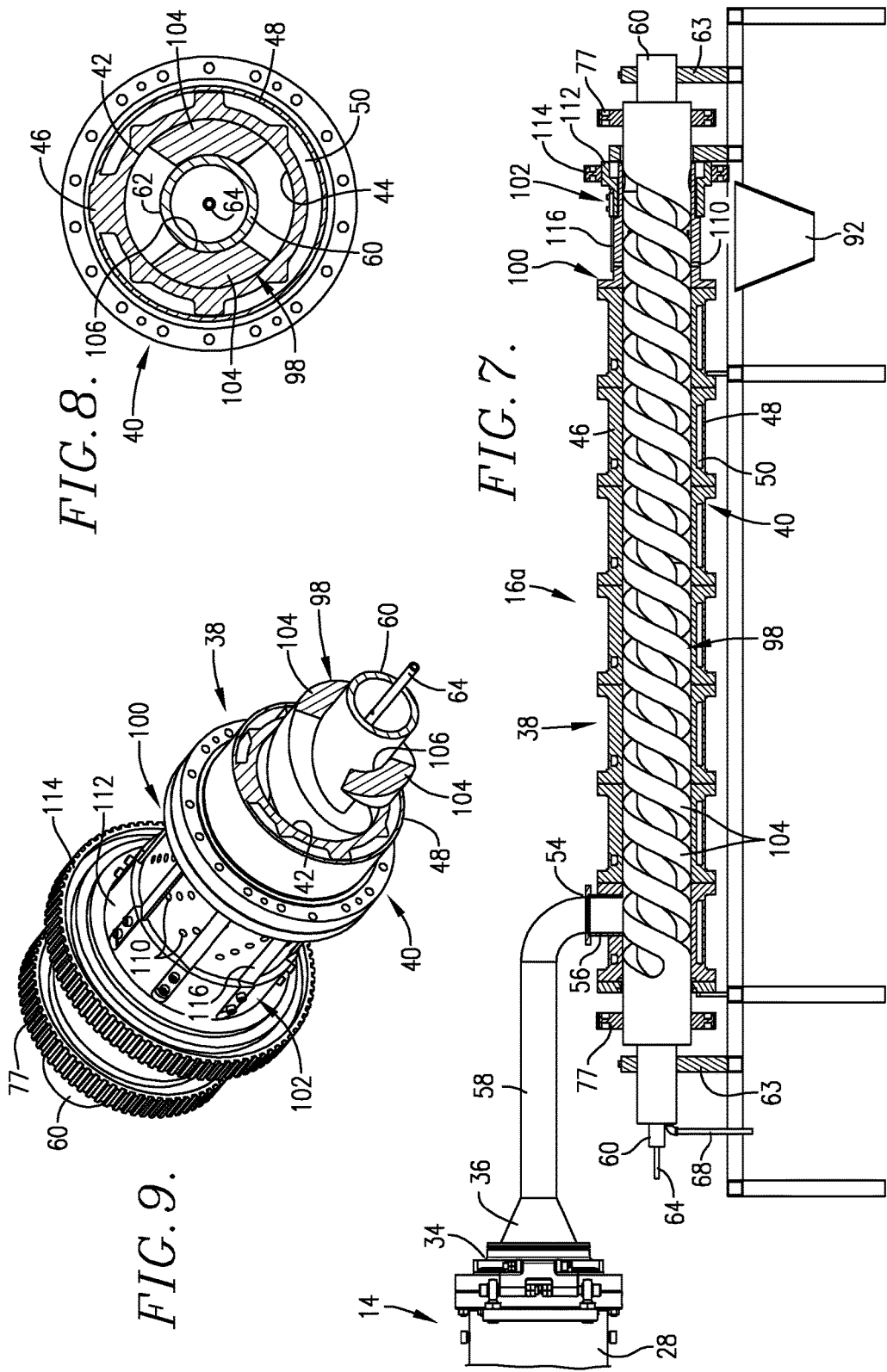

METHOD FOR PROCESSING OF HIGH MEAT CONTENT FOOD OR FEED PRODUCTS

CROSS-REFERENCE TO RELATED APPLICATION

This is a division of application Ser. No. 14/801,946 filed on Jul. 17, 2015, which is incorporated by reference herein in its entirety.

BACKGROUND OF THE INVENTION

Field of the Invention

The present invention is broadly concerned with processing systems and methods for food or feed materials, and particularly food or feed formulations containing high meat contents. The systems include an extruder operable to initially process and heat the formulations, with a downstream processor designed to complete the cooking and formation of final products. The processor includes an elongated processor barrel presenting an inner surface, with a central body within the processor barrel presenting an outer surface, thereby defining an annular region between the inner and outer surfaces. An elongated, rotatable processing element is located within the region about the central body, and has elongated scraping elements in the form of vanes or ribs. During processing, extrudates from the upstream extruder are passed through the annular region of the processor while the inner and outer surfaces of the processor are heated and the processing element is rotated. The final products from the processor may be collected by gravitation or through the use of a die assembly.

Description of the Prior Art

Many human foods or animal feeds are produced using extrusion equipment. For example, the majority of pet and aquatic feeds are extruded products. In general, extrusion equipment and processing parameters are well known in the art for conventional products, such as standard pet feeds containing quantities of protein, fats, and starch. Moreover, such extruded feeds can be supplemented with relatively small amounts of meats using known equipment and processing techniques.

In recent years, however, there has been a demand for extruded products containing relatively high quantities of meat, on the order of 30-40% by weight or greater. For example, many pet owners have expressed a desire for "humanized" pet foods, which have the appearance of meat and similar products normally consumed by humans. Despite these demands, incorporation of these large quantities of meat into extruded products has proved to be difficult, requiring expensive equipment upgrades and sophisticated processing. In fact, 40% meat levels in extruded pet feeds has heretofore proved to be virtually impossible for any reasonable cost.

There is accordingly an unsatisfied need in the art for improved processing systems and methods allowing the high capacity, relatively low cost production of food or feed products having high meat contents.

Prior art references include U.S. Pat. Nos. 3,694,227, 3,883,672, 4,126,177, 4,272,466, 5,228,775, 5,964,278, 5,074,125, 7,097,345, 7,811,617, 7,922,384, and 8,628,815; US Published Application No. 2014/0037812; foreign references EP2733453 and RU2409993; and the following non-patent references: "Extrusion Systems: Components" http://digitalcommons.unl.edu/cgi/viewcontent.cgi?article=1312&context=biosysengfacpub (Accessed Jun. 30, 2015); and "Extrusion Cooking and Related Technique" http://www.wiley-vch.de/books/sample/3527328882_c01.pdf (Accessed Jun. 30, 2015).

SUMMARY OF THE INVENTION

The present invention overcomes the problems outlined above, and provides improved food or feed processing systems, and corresponding methods, allowing incorporation of very high quantities of meat into such products. Generally, in the invention, food or feed materials are serially processed first in an extruder and followed by a novel processor. The final products are self-sustaining and have very desirable appearance and eating qualities.

More specifically, the systems of the invention include an extruder having an elongated, tubular barrel presenting an inlet for receiving food or feed material, and a spaced outlet. At least one elongated, axially rotatable, helically flighted screw is located within the barrel, and the overall extruder is operable to initially process the material and to generate a heated extrudate from the extruder outlet.

The downstream processor includes an elongated, tubular processor barrel presenting an inner surface, an extrudate inlet, and a final product output. An elongated body is located within the processor barrel and presents an outer surface proximal to the inner surface of the processor barrel so as to define an annular region between these inner and outer surfaces. A tubular processing element surrounds the central body and is situated within the annular region. A drive assembly is operably coupled with the processing element in order to rotate it relative to the body, and to scrape material from the inner and outer surfaces. Heating structure is provided to heat the inner and outer surfaces of the processor barrel and central body, to thereby heat material passing through the annular region. A conduit operatively connects the extruder outlet and the extrudate inlet of the processor.

In preferred forms, the extruder is a twin screw extruder having a pair of elongated, intermeshing, helically flighted screw assemblies within the extruder barrel. However, the extruder is not normally provided with a restricted orifice die, and rather is designed to force material from the extruder barrel outlet into and through the downstream processor.

Advantageously, the central body of the processor is in the form of an elongated, stationary tube equipped with apparatus for steam heating of the tube, and the tubular processor rotates relative to the tube. Similarly, the processor barrel is jacketed to permit steam heating of the barrel inner surface.

The preferred processing element has a plurality of helical vanes along the length thereof, with corresponding openings between the vanes. In order to achieve the best processing of materials passing through the processor, and to minimize buildup of materials on the barrel and tube surfaces, the thickness of the processor element closely corresponds with the radial surface-to-surface distance between the inner surface of the barrel and the outer surface of the tube. Sufficient clearance is provided to allow rotation of the processor element, but with adequate scraping of the adjacent surfaces.

Preferably, the central tube and processing element extend beyond the output end of the processor barrel, thereby allowing the final product from the processor to gravitate in the form of strips or pieces from the processing element. If desired, die structure may be provided at the outlet of the processor.

In some systems in accordance with the invention, it may be necessary or desirable to provide a scraped surface heat exchanger upstream of the extruder. This is used where, e.g., frozen or cold meat material is to be processed in the extruder. The function of the heat exchanger is to elevate the temperature of the cold meat to thereby reduce the processing load on the extruder.

The invention also provides a method of processing food or feed materials, which generally involves serial passage of materials through an extruder and a novel processor. The method generally comprises the steps of directing food or feed materials through an extruder including an elongated, tubular barrel and at least one elongated, axially rotatable, helically flighted screw within the barrel, the extruder operable to initially heat and process the materials and to generate an extrudate from the outlet. Thereafter, the extrudate is passed into and through a processor presenting an annular region between the inner surface of an outer processor barrel, and the outer surface of an elongated body within the processor barrel; a tubular, rotatable processor element is situated within the annular region. During such passage, the inner surface of the processor barrel and the outer surface of the processor central body are heated, and the processor element is rotated relative the central body. The final product output from the processor may then be collected by gravitation or through the use of a die assembly.

Heating of the inner and outer surfaces of the processor is most easily effected by steam heating of the barrel and central body, the latter preferably in the form of an elongated, closed-ended tube. In most cases, the tube is stationary, and the processing element rotates relative thereto.

BRIEF DESCRIPTION OF THE DRAWINGS

FIG. 1 is a schematic flow diagram illustrating the preferred equipment and process steps in the production of food or feed products in accordance with the invention;

FIG. 2 is a partially schematic, sectional view illustrating a preferred processor in accordance with the invention;

FIG. 3 is a perspective view of the preferred processor illustrated in FIG. 2, shown coupled with the outlet end of a twin screw extruder;

FIG. 4 is a vertical sectional view illustrating the internal construction of the processor of FIG. 2;

FIG. 7 is a sectional view illustrating the internal construction of the processor of FIG. 5;

FIG. 8 is a vertical sectional view illustrating the internal construction of the processor of FIG. 5 and FIG. 9 is a fragmentary perspective view of the output end of the processor illustrated in FIG. 5.

DETAILED DESCRIPTION OF THE PREFERRED EMBODIMENTS

Embodiment of FIGS. 1-4

Figure 5:
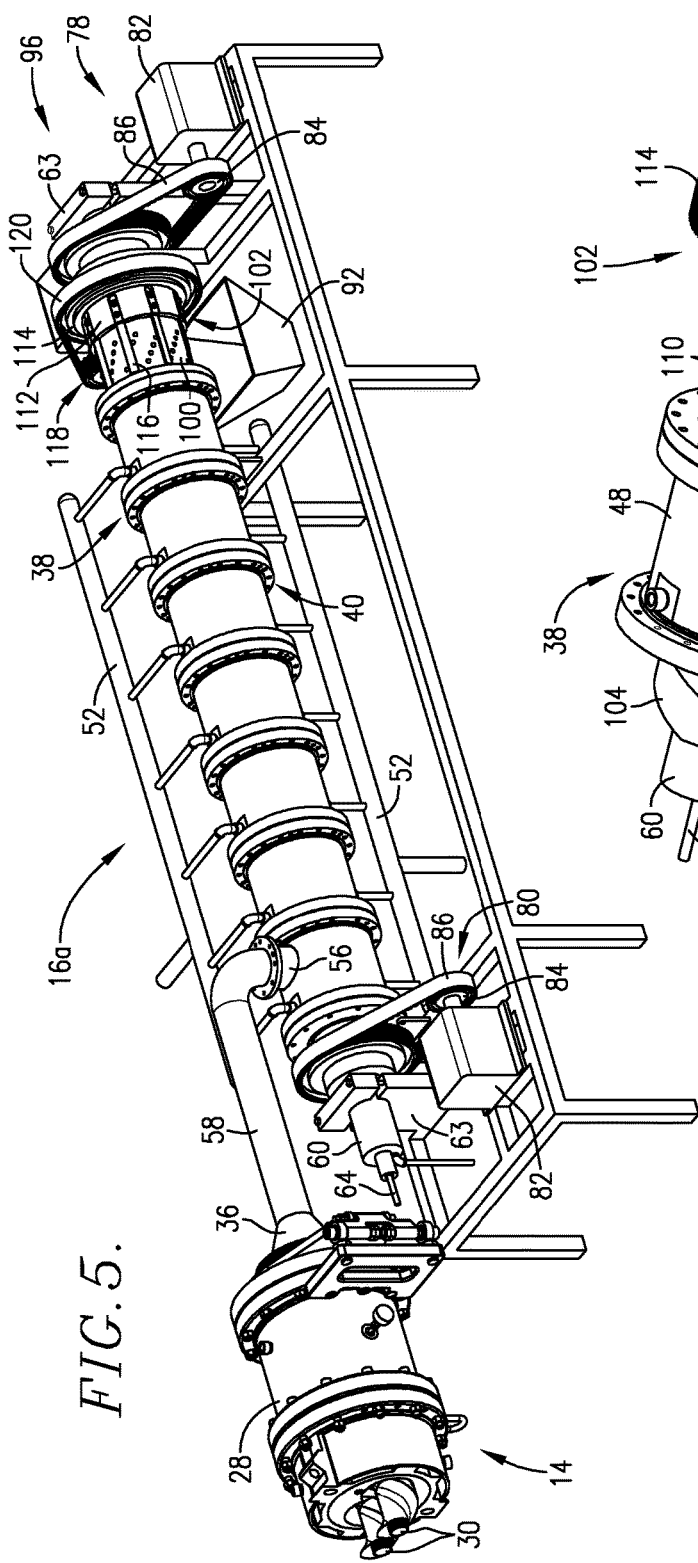
FIG. 5 is a perspective view depicting another processor in accordance with the invention, shown coupled to the outlet end of a twin screw extruder.
Figure 6:
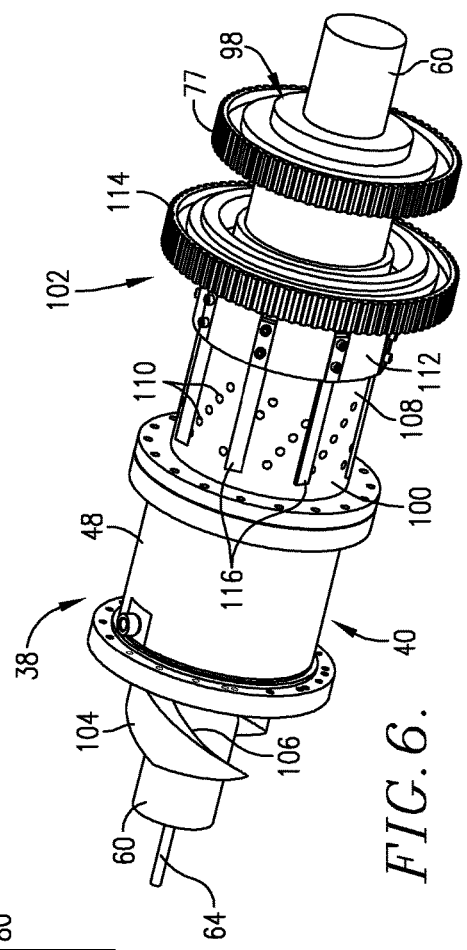
FIG. 6 is a fragmentary perspective view illustrating the outlet end of the processor of FIG. 5, and illustrating in detail the peripheral die and rotary knife structure.

Turning first to FIG. 1, it will be observed that a system 10 for the processing of food or feed materials broadly includes an optional scraped surface heat exchanger 12, a single or twin screw extruder 14, and a processor 16. The invention in some aspects is designed to provide food or feed materials having relatively high meat contents on the order of 30% by weight or greater. In such cases, a high meat fraction 18 is directed into heat exchanger 12 where the temperature of the fraction is elevated. The heated output 20 from exchanger 12 is then fed to extruder 14, along with a dry ingredient recipe 22. The heated high meat fraction 18 and dry ingredient recipe 22 are co-processed in extruder 14 to generate an extruder output 24. The latter is fed to processor 16 to generate a final product 26. In other systems, however, the heat exchanger 12 may not be required, particularly if the starting ingredients are essentially ambient temperature or warmer.

The extruder 14 is itself conventional, and includes an elongated, multiple-head tubular barrel 28 (shown fragmentarily in FIGS. 3, 5, and 7) having one or more elongated, axially rotatable, helically flighted extrusion screw assemblies 30 therein. The barrel 28 includes an input 32 (FIG. 1) and an outlet 34. In the illustrated embodiments, the extruder 14 is a conventional twin-screw extruder of the type commercialized by Wenger Manufacturing, Inc. of Sabetha, Kans. However, in lieu of a conventional restricted orifice die typically provided at outlet 34, the extruders 14 of the invention are equipped with frustoconical transitions 36, which do not provide any appreciable degree of backpressure within barrel 28, or flow restriction.

The processor 16 illustrated in FIGS. 1-4, includes an elongated tubular barrel 38 made up of a plurality of end-to-end interconnected tubular barrel heads 40, which cooperatively define an elongated, continuous central bore 42 presenting an innermost surface 44. Each head 40 includes a primary body 46 with an outer shell 48 secured thereto, with the body 46 configured to present steam passageways 50 allowing heating of the heads. Appropriate steam manifold structure 52 is operatively coupled to the heads 40 in order to direct steam into the passageways 50, and to collect condensate therefrom. The barrel 38 is equipped with an inlet 54, in the form of an upstanding pipe stub 56. An elongated conveying conduit 58 is attached between transition 36 and stub 56, as best seen in FIG. 3.

The barrel 38 also has an elongated, closed-ended tube 60 therein, which presents an outer surface 62 in facing relationship to the inner surface 44 of the barrel 38. In the depicted embodiment, the tube 60 is stationary, and supported by mounts 63. A central steam pipe 64 extends substantially the full length of the tube 60 and has a series of axially spaced apart steam flow apertures (not shown) for delivering steam into the tube 60 in order to heat the outer surface 62 thereof. The tube 64 is attached to a steam source 66, and a condensate outlet drain 68 is also provided. It will be observed that the outer surface 62 of tube 60 and the adjacent inner surface 44, cooperatively define an annular region 70. In the embodiment of FIGS. 1-4, the radial, surface-to-surface dimension of the region 70 is 0.66 inches, or 16.8 mm.

The overall processor 16 also includes an elongated, axially rotatable, tubular processing element 72, which is positioned within the region 70 and extends throughout the complete length of barrel 38. As best illustrated in FIG. 2, the element 72 has fore-and-aft connection sections 74, 76 outboard of the adjacent ends of barrel 38, and each equipped with a gear 77. Coordinated drive assemblies 78, 80 are operatively coupled with the connection ends 74, 76, and each includes a drive motor 82 having an output gear 84, with a drive belt 86 trained about the gears 84 and 77, as shown. The drive assemblies serve to rotate the element 72 relative to tube 60 and barrel 28, and the thickness of the element 72 is such that the relative movement serves to effectively scrape the surfaces 44 and 62 to prevent buildup of material thereon. The element 72 also includes a plurality of generally helically extending vanes 88 with corresponding helical openings 90 therebetween. The vanes 88 extend from a point adjacent the input end of barrel 38 to a point extending beyond the remote output end of the barrel. The area between the butt end of barrel 38 and drive belt 86 effectively defines the output of processor 16. As will be explained in further detail, as product emerges from the annular region 70, it falls under the influence of gravity into collector 92 and thence to an output belt 94.

Operation

Generally speaking, the operation of system 10 involves initially heating a high-meat fraction 18 within heat exchanger 12, with the output thereof being directed to the input 32 of extruder 14. Simultaneously, a dry fraction 22 is also fed into the input 32. The fractions are combined and initially processed in extruder 14, and the extruder output 24 is directed to the input 54 of processor 16. In the processor, the extruder output is subjected to heating and disruption, with the creation of thin, fully processed strips or pieces of final product 26, which are collected and further treated as desired. Furthermore, the scraping action of the element 72 serves to clean the adjacent surfaces 44 and 62 to prevent undo material buildup thereon.

In more detail, the high-meat fraction 18 is normally frozen or at least cold (e.g., 5° C.), and the heat exchanger 12 is used to elevate the temperature of the fraction within the range of from about 30-50° C. As mentioned previously, if the incoming high-meat fraction is warm or at ambient temperature, the heat exchanger 12 need not be used.

The conditions within extruder 14 are relatively mild, and are designed to combine the fractions 18 and 22 without complete denaturing of the protein in the meat fraction. Generally, the extruder should be operated so as to create an output 24 having a temperature of from about 50-75° C. The pressure conditions within the extruder barrel normally range from about 150-250 psig, more preferably from about 180-220 psig. As will be appreciated, these extruder conditions can be established by appropriate heating of the extruder barrel via steam input and/or by rotation of th screw(s) 30. Screw rpms normally range from about 50-600, and more preferably from about 100-400. Residence times for the materials passing through the extruder barrel range from about 3-60 seconds, more preferably from about 5-40 seconds.

In the processor 16, the combined extruder output 24 is heated and subjected to the action of the rotating processing element 72. Normally, the final product output 26 should have a temperature of from about 80-110° C., more preferably from about 85-100° C. The element 72 is typically rotated at a rate of from about 15-60 rpm, and more preferably from about 20-40 rpm. In order to achieve the desired degree of cook, steam is normally directed to barrel 38 via the manifold system 52, and simultaneously is directed through central steam tube 64. Accordingly, the adjacent surfaces 44 and 62 are both heated to effect the desired cook.

The processing element 72 generally does not produce sufficient pressure or motive force to itself propel the material 24 through barrel 38. This is achieved principally because of the extruder 14, which continually feeds output 24 into the processor and moves the material along and through the barrel 38.

In one hypothetical example, 200 parts fresh meat at a temperature of 5° C. are fed to the scraped surface heat exchanger 12, which serves to elevate the temperature of the meat fraction to 40° C. This meat fraction is then directed to a Wenger twin screw extruder 14 along with 100 parts of a dry materials fraction made up of 54% pea flour and 46% potato starch. These materials are co-processed in the extruder 14 at 200 psig in order to achieve an extruded product output temperature of 60° C. This extruded product is then delivered to processor 16, which completes the cooking and formation of the extrudate so that final product 26 is at a temperature of 90° C. and is in the form of coherent strips or pieces of product wherein the protein fraction is essentially completely denatured and the starch fraction is essentially completely gelatinized. The final product is then conventionally dried to a total moisture content of approximately 10% by weight. The final product contains 40% by weight meat, 32% by weight pea flour, and 28% by weight potato starch, on a dry basis, and 25% by weight protein, 17.6% by weight fat, 45.6% by weight starch/fiber, and 10% by weight water, on a wet basis. If desired, further downstream treatment of the final product can be undertaken, e.g., appropriate sizing of the product or application of fat to the outer surfaces

Embodiment of FIGS. 5-9

FIGS. 5-9 illustrate another system 96, which is very similar to the system 10. The principal differences in the second embodiment are present in the processor 16a, which has a differently configured processing element 98, along with a peripheral die 100 at the output end of the element 98, and a powered rotatable cutting assembly 102. Inasmuch as many of the components of system 96 are identical with those of system 10, like components are numbered identically, and will not be further described.

Specifically, the radial distance between the outer surface 62 of central tube 60, and the inner surface 44 of bore 42 is 1.82 inches, or 46.2 mm. Accordingly, the processing element 98 is of thicker construction and has a pair of helical vanes 104 therein, with corresponding helical openings 106 therebetween. It will be observed that the pitch lengths of the vanes 104 are considerably smaller as compared with those of vanes 88.

The processor 16a has an endmost peripheral die 100 (see FIGS. 6 and 9), which is in the form of a solid tubular head 108 having a plurality of die openings 110 formed therein and extending through the thickness of the head. The head 108 surrounds the forward or output end of processing element 98, so that the material being processed is forced radially outwardly through the openings 110.

The cutting assembly 102 includes a tubular, axially rotatable mount 112, which surrounds die 100 and is equipped with a driving gear 114. A series of circumferentially spaced apart, rearwardly extending knives 116 are affixed to the mount 112 and extend over the die openings 110. A drive 118, including drive belt 120, is coupled with driving gear 114 so as to rotate the knives 116 during operation of the processor.

It will thus be appreciated that as the extrudate emerges from the openings 110, it is cut by the rotating knives 116. This cut product then falls by gravity into collector 92, as previously explained.

In general, the operating conditions set forth above for the extruder 14 and processor 16 in the embodiment of FIGS. 1-4 are also applicable to the second embodiment of FIGS. 5-9.

The embodiments of FIGS. 1-4 and 5-9 illustrate presently preferred implementations of the present invention. However, the invention is not limited to these embodiments, and a number of equipment or process alterations may be made with out departing from the scope of the invention. For example, the embodiments make use of a pair of end-mounted drive assemblies for rotating the processing element 72. If desired, only one end of the element 72 need be driven. Also, the tube 60 is stationary in the preferred embodiments. This need not be the case, so long as there is relative movement between the processing element 72 and the tube 60. Thus, the tube 60 may be rotated at a different rotational speed as compared with the processing element 72, and/or the tube 60 may be rotated in the same direction as the element 72, or in the opposite direction. While the radial surface-to-surface dimensions between the inner and outer surfaces of the processors 16 and 16a have been indicated, such radial distances are more generally range from about 5-75 mm, and more preferably from about 10-50 mm. Smaller distances are of course advantageous from a heat transfer standpoint, but larger distances, and correspondingly thicker processing elements 72, give a greater degree of mixing and agitation of the materials being processed.

In addition, it is not necessary that the processing elements 72 or 98 be equipped with helical vanes. That is, vanes or scrapers of essentially configuration may be used, e.g., relatively thin straight vanes or radially outwardly extending blades could be employed. The preferred processor barrels and processing elements, while preferably of essentially constant diameter, may if desired be tapered, or the barrels may be tapered and the elements of constant diameter, or vice versa.

We claim:

1. A method of processing food or feed materials, comprising the steps of:
   directing said food or feed materials through an extruder including an elongated, tubular barrel and at least one elongated, axially rotatable, helically flighted screw within the barrel, said extruder operable to initially heat and process said materials and generate an extrudate; and
   passing said extrudate into and through a processor including an elongated, tubular processor barrel presenting an inner surface, an elongated body within the processor barrel presenting an outer surface, with an annular region between said inner and outer surfaces, and a processing element within said annular region,
   said passing step comprising the steps of moving said extrudate through said annular region while rotating said processing element relative to said elongated body with the element scraping said inner and outer surfaces, in order to create a final product from the processor.

2. The method of claim 1, said extruder being a twin screw extruder.

3. The method of claim 1, said elongated body comprising a stationary tube.

4. The method of claim 1, including the step of heating said elongated body.

5. The method of claim 1, said processing element having a plurality of elongated vanes along the length thereof with elongated openings between said vanes.

6. The method of claim 5, said elongated vanes and openings being helical.

7. The method of claim 1, including the step of rotating said processing element by rotating the element at spaced locations along the length thereof.

8. The method of claim 1, said processing element extending beyond the end of said processor barrel, including the step of recovering said final product gravitating from the processing element outboard of said processor barrel.

9. The method of claim 1, including the step of forcing material from the processing element through an extrusion die, and cutting the material from the die.

10. The method of claim 9, said extrusion die being a peripheral die, and including the step of forcing material from the processing element radially outwardly through the peripheral die.

11. The method of claim 1 including the step of initially passing food or feed material through a heat exchanger for initial heating thereof, and then passing material into said extruder.

12. The method of claim 1, including the steps of operating said extruder by rotating said at least one screw at a pressure of from about 150-250 psig, with rotation of said at least one screw at a rate of from about 50-600 rpm.

13. The method of claim 1, including the step of rotating said processing element at a rate of from about 5-60 rpm.

14. The method of claim 1, said extruder operable to heat said materials to a temperature of from about 50-75° C.

15. The method of claim 1, including the step of simultaneously heating said inner and outer surfaces during rotation of said processing element.

16. The method of claim 7, including the step of rotating said processing element adjacent the ends thereof.

* * * * *